United States Patent [19]

Hämäläinen et al.

[11] Patent Number: 5,978,386
[45] Date of Patent: Nov. 2, 1999

[54] PACKET RADIO SYSTEM, AND A TERMINAL EQUIPMENT FOR A PACKET RADIO SYSTEM

[75] Inventors: Jari Hämäläinen, Tampere; Hannu Kari, Veikkola; Arto Karppanen, Helsinki, all of Finland

[73] Assignee: Nokia Telecommunications OY, Espoo, Finland

[21] Appl. No.: 08/860,827

[22] PCT Filed: Jan. 8, 1996

[86] PCT No.: PCT/FI96/00020

§ 371 Date: Sep. 18, 1997

§ 102(e) Date: Sep. 18, 1997

[87] PCT Pub. No.: WO96/21984

PCT Pub. Date: Jul. 18, 1996

[30] Foreign Application Priority Data

Jan. 10, 1995 [FI] Finland ..................................... 950117

[51] Int. Cl.⁶ ...................................................... G06F 13/00
[52] U.S. Cl. .......................... 370/466; 370/338; 370/474
[58] Field of Search .................................... 370/338, 465, 370/466, 469, 470, 471, 474, 477, 521, 392; 455/134

[56] References Cited

U.S. PATENT DOCUMENTS

| | | |
|---|---|---|
| 4,755,992 | 7/1988 | Albal . |
| 5,099,499 | 3/1992 | Hammar . |
| 5,144,644 | 9/1992 | Borth . |
| 5,157,672 | 10/1992 | Kondou et al. .......................... 455/134 |
| 5,181,209 | 1/1993 | Hagenauer et al. . |
| 5,446,736 | 8/1995 | Gleeson et al. . |
| 5,535,199 | 7/1996 | Amri et al. .............................. 370/392 |

FOREIGN PATENT DOCUMENTS 2 232 854 12/1990 United Kingdom .
96/00468 1/1996 WIPO .

OTHER PUBLICATIONS

W. Simpson, PPP Standards RFC 1661, Internet Architecture Board, Jul. 1994, pp. 1–44.

W. Simpson, PPP Standards RFC 1662, Internet Architecture Board, Jul. 1994, pp. 1–21.

Hagenauer et al: "A Viterbi Algorithm with Soft–Decision Outputs and its Applications", IEEE Global Telecommunication Conference & Exhibition, Nov. 27–30, 1989 "Communications Technology for the 1990s and Beyond", vol. 3 of 3, pp. 1680–1686.

*Primary Examiner*—Chi H. Pham
*Assistant Examiner*—Maikhanh Tran
*Attorney, Agent, or Firm*—Pillsbury Madison & Sutro, LLP

[57] ABSTRACT

A packet radio system encapsulates data packets of external data networks by a point-to-point protocol PPP (FIGS. 4A, 4B), and passes them through one or more sub-networks to a point which supports the protocol of the encapsulated data packet. In addition, a special radio link protocol of the packet radio network is required on the radio interface between a mobile data terminal equipment and a support node. PPP packets are encapsulated in data packets of said radio link protocol. The disadvantage of the arrangement is that the data packets of both the PPP protocol and the radio link protocol contain protocol-specific fields, which reduces the transmission capacity of user information. Therefore, a PPP packet is compressed (FIG. 4C) before the encapsulation (FIG. 4D) by removing therefrom the unnecessary control fields. After having been transferred over the radio interface, the PPP packet is decompresssed into its original format (FIGS. 4F, 4G).

16 Claims, 3 Drawing Sheets

| FLAG | ADDRESS | CONTROL | PROTOCOL | DATA | FCS | FLAG |
|---|---|---|---|---|---|---|
| 01111110 | 11111111 | 00000011 | 16 bits | | 16 bits | 01111110 |

PPP DATA FRAME

COMPRESSED PPP DATAFRAME

GLP DATAFRAME

COMPRESSED PPP DATA FRAME

DECOMPRESSED PPP DATA FRAME

PACKET RADIO SYSTEM, AND A TERMINAL EQUIPMENT FOR A PACKET RADIO SYSTEM

This application is the national phase of international application PCT/FI96/00020, filed Jan. 8, 1996 which was designated the U.S.

FIELD OF THE INVENTION

The present invention relates to a packet radio system, comprising a digital mobile communication network; at least one packet radio support node, connected to the mobile communication network and to one or more other packet radio support nodes and/or providing an access point to an external packet data network; a packet data terminal equipment providing an access point for packet data transmission taking place over the radio interface, said access point supporting a universal communication protocol used by an application associated with the terminal equipment.

BACKGROUND OF THE INVENTION

Mobile communication systems have been developed because there has been a need to free people to move away from fixed telephone terminals without this hindering their reachability. While the use of different data transmission services in offices has increased, different data services have also been introduced into mobile communication systems. Portable computers enable efficient data processing everywhere the user moves. As for mobile communication networks, they provide the user with an efficient access network for mobile data transmission, such an access network providing access to actual data networks. In order to do this, different new data services are designed for existing and future mobile communication networks. Digital mobile communication systems, such as the pan-European mobile communication system GSM (Global System for Mobile Communication), support particularly well mobile data transmission.

General Packet Radio Service GPRS is a new service in the GSM system, and it is one the items of the standardization work of the GSM phase 2+ in ETSI (European Telecommunication Standard Institute). The GPRS operational environment consists of one or more sub-network service areas, which are interconnected by a GPRS backbone network. A sub-network comprises a number of packet data service nodes, which are referred to as GPRS support nodes (or agents) in this context, each packet data service node being connected to a GSM mobile communication network in such a manner that it is capable of providing a packet data service for mobile data terminal equipments via several base stations, i.e. cells. The intermediate mobile communication network provides circuit switched or packet switched data transmission between a support node and mobile data terminal equipments. Different sub-networks are connected to an external data network, such as a public switched packet data network PSPDN. The GPRS service thus produces packet data transmission between mobile data terminal equipments and external data networks, a GSM network acting as an access network. One aspect of the GPRS service network is that it operates almost independently of the GSM network. One of the requirements set for the GPRS service is that it must operate together with external PSPDNs of different types, for instance with Internet or X.25 networks. In other words, the GPRS service and a GSM network should be capable of serving all users, irrespective of which type of data networks they want to register in via the GSM network or which protocols are used in a data terminal equipment. This means that the GSM network and the GPRS service have to support and handle different network addressings and data packet formats, and be prepared for new (future) data network protocols.

DISCLOSURE OF THE INVENTION

The object of the present invention is a packet radio system, providing reliable and effective data transmission, which supports several external data networks and protocols and enables new protocols to be supported as flexibly as possible and with minor modifications.

This object is achieved with the packet radio system described in the introduction, characterized according to the invention by using a point-to-point protocol independent of said universal communication protocol in the internal transmission of the packet radio system, a data packet according to said point-to-point protocol containing the control fields used by the protocol, an identification field identifying the protocol used by the terminal equipment, and a data field, a data packet according to the universal protocol being thus encapsulated in the data field of a data packet according to the point-to-point protocol in the internal transmission of the packet radio system, using a special radio link protocol between the packet data terminal equipment and said at least one packet radio support node on the radio interface, said radio link protocol supporting point-to-multipoint addressing and the control of data packet retransmission, a data packet according to said radio link protocol containing the control fields used by the protocol and a data field, arranging the packet data terminal equipment and said at least one support node to compress a data packet according to the point-to-point protocol, transmitted over the radio interface, by removing therefrom at least one control field and to encapsulate the remaining fields in the data field of a data packet according to the radio link protocol, arranging the packet data terminal equipment and said at least one support node to decompress a compressed data packet according to the point-to-point protocol, received over the radio interface, by adding thereto the fields removed in the compression before the data packet is forwarded further.

The present invention also relates to a terminal equipment for a packet radio system, said terminal equipment providing an access point for packet data transmission taking place over the radio interface, said access point supporting a universal communication protocol used by the application associated with the terminal equipment. The terminal equipment is characterized in that the terminal equipment uses a point-to-point protocol independent of said universal communication protocol in the internal transmission of the packet radio system, a data packet according to said point-to-point protocol containing the control fields used by the protocol, an identification field identifying the protocol used by the terminal equipment, and a data field, the terminal equipment uses, in the transmission taking place over the radio interface, a special radio link protocol used in the inter-nodal transmission of the packet radio system, said protocol supporting point-to-multipoint addressing and the control of data packet retransmission, a data packet according to said radio link protocol containing the control fields used by the protocol and a data field, the terminal equipment is arranged to encapsulate a transmitted data packet according to the universal protocol in the data field of a data packet according to said point-to-point protocol, the terminal equipment is arranged to compress a data packet according to the point-to-point protocol, transmitted over the radio interface, by removing therefrom at least one control field and to encapsulate the remaining fields in a data packet according to the radio link protocol, the terminal equipment is arranged to decompress a compressed data packet according to the point-to-point protocol, received over the radio interface, by adding thereto the fields removed in the compression, the terminal equipment is arranged to release a data packet according to the universal protocol from a decompressed data packet according to the point-to-point protocol.

In the present invention, the packet radio system encapsulates data packets of external data networks and transports them through one or more sub-networks to a point which supports the protocol of the encapsulated data packet. At this interface, the packet of an external network is released from the encapsulation and sent to an external data network. Thus, it is necessary that a general, standardized protocol exist between a mobile data terminal equipment and a support node serving the mobile data terminal equipment, said protocol providing the transmission of user data independently of the network, transport and higher level protocols used. With the implementation of such a single protocol, the data terminal equipment provides a transmission path for all applications irrespective of what type of external data network they are communicating with. According to the invention, for instance the point-to-point protocol PPP defined in standards RFC 1661 and 1662 of Internet Architecture Board (IAB), and the data encapsulation method thereof, is used as such a packet radio network-internal protocol that encapsulates data packets of external data networks. However, the PPP does not provide all functions required for the operation of the link layer over the radio interface particularly in an environment where the number of transmission errors may be great. Consequently, a special radio link protocol which can provide all the necessary functions is required between a mobile data terminal equipment and a support node on the radio interface of the packet radio network. The two most important aspects provided by this protocol are the support of point-to-multipoint addressing and the control of the data packet retransmission. As a result of this solution, PPP data packets are transferred as encapsulated in data packets of the radio link protocol. A PPP data packet can be arranged in radio link protocol packets in a number of ways: one PPP packet in one radio link protocol packet, several PPP packets in one radio link protocol packet, one PPP packet in several radio link protocol packets. One of the drawbacks of this protocol arrangement is that the data frames of both the PPP and the radio link protocol contain the control fields used by the protocols. Normally, all this information has to be transferred from end to end. As a result, this overhead control data of the link layer reduces the transmission capacity of user information. To obviate this problem, the amount of the control data of the link layer must be minimized. According to the invention, this is done by removing part or all of the unnecessary fields from a PPP data frame. This is possible because in a PPP data frame, the values of flag fields, address field and control field are constant and do not therefore contain any real information. Thus, according to the invention, the PPP data frames are compressed by removing therefrom at least part of the control fields before they are transmitted over the radio path. Since the removed fields are constant, the fields can easily be returned into the compressed data frame after the transmission over the radio path. Since a data frame according to the radio link protocol contains a dedicated check sum field, the check sum field of a PPP data frame can also be omitted, if necessary, before the transmission over the radio interface, and the check sum can be recalculated and the check sum field added again to the compressed packet transmitted over the radio interface. The PPP protocol according to the standard may also contain stuffing bytes, which are used for preventing the appearance of the bit patterns used in the control in the data field. Since, according to the invention, PPP frames are transmitted as encapsulated in radio interface packets on the radio interface, these forbidden bit patterns have no effect on the transmission. Thus, according to the invention, these stuffing bytes may be removed from the data before the transmission to the radio interface and returned to the data after the transmission over the radio interface. This is done in order that it would not be necessary to modify the general data network protocols provided in the terminal equipments. By means of the compression of the invention, the transmission capacity of user data can be significantly improved.

A PPP frame contains a protocol identification field, the value of which identifies the protocol used by the application. The packet radio network routes an encapsulated data packet to such a point of the network or a point of an external data network that supports the protocol indicated by the identification field. At this point, the encapsulation is stripped away, and the original data packet is routed to its destination on the basis of the address information contained therein.

BRIEF DESCRIPTION OF THE FIGURES

In the following, the invention will be described by means of the preferred embodiments with reference to the accompanying drawing, in which.

DESCRIPTION OF THE PREFERRED EMBODIMENTS

The present invention can be used in packet radio systems of different types. The invention is particularly well suited for implementing the general packet radio service (GPRS) in the pan-European mobile communication system GSM (Global System for Mobile Communication) or in corresponding digital systems such as DCS1800 and PCN (Personal Communication Network). In the following, the preferred embodiment of the invention will be described by means of the GPRS service and the GSM system, without restricting the invention to such a particular packet radio system, however.

Figure 1:
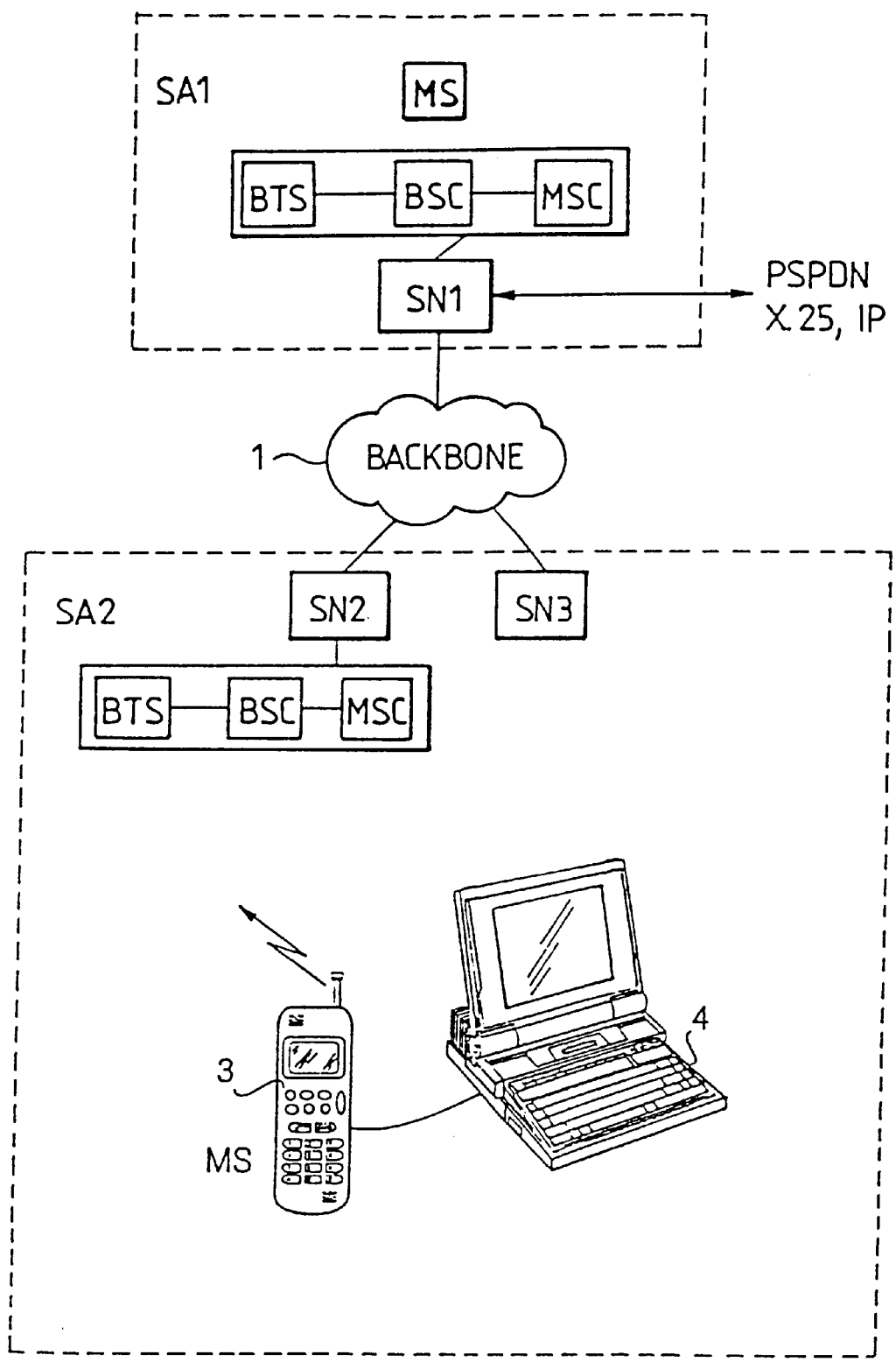
FIG. 1 is a block diagram which illustrates a packet radio system of the invention.

FIG. 1 illustrates the basic structure of a GPRS packet radio network. The GPRS packet radio system consists of one or more sub-network service areas, such as SA1 and SA2, which are interconnected by a GPRS backbone network 1 (Backbone). Typically, the backbone network is the local network of the operator of the packet radio network, for instance an IP network. The sub-network service area SA1 and SA2 comprises one or more packet data service nodes, which are referred to as agents or GPRS support nodes. FIG. 1 shows GPRS support nodes SN1 and SN2. One or more of the GPRS support nodes may also act as gateway support nodes towards an external data network, for instance towards a public switched packet data network PSPDN. The backbone network 1 may also be provided with special gateway nodes for connecting to data networks.

Each GPRS support node controls a packet data service within the area of one or more cells in a cellular packet radio network. For this, each support node SN1 and SN2 is connected to a certain local part of the GSM mobile system. This connection is typically established in a mobile exchange MSC via an interworking function IWF, but in some situations it may be advantageous to provide the connection directly in the base station system BSS, i.e. in a base station controller BSC or one of the base stations BTS. The mobile station MS located in a cell communicates over the radio interface with a base station BTS and further through the mobile communication network with the GPRS support node SN1, SN2, SN3 to the service area of which the cell belongs. In principle, the mobile communication network existing between the GPRS support node and the mobile data terminal equipment MS merely delivers packets between these two. In order to do this, the mobile communication network may provide either a circuit switched connection or packet switched data packet transmission between the terminal equipment MS and the serving support node SN. An example of a circuit switched connection between a terminal equipment MS and a support node (agent) is given in Finnish Patent Application 934115. An example of packet switched data transmission between a terminal equipment MS and a support node (agent) is given in Finnish Patent Application 940314. However, it should be noticed that the mobile communication network provides merely a physical connection between the terminal equipment MS and the support node, and the exact operation and structure thereof do not have essential significance as regards the invention. As for more detailed description of the GSM system, reference is made, however, to ETSI/GSM specifications and to "The GSM System for Mobile Communications", M. Mouly and M. Pautet, Palaiseau, France, 1992, ISBN:2-9507190-07-7.

A typical mobile data terminal equipment consists of a mobile station 3 in a mobile communication network, and a portable computer 4 connected to the data interface of the mobile station. The mobile station 3 may be for instance a Nokia 2110, which is manufactured by Nokia Mobile Phones Ltd., Finland. By means of a PCMCIA-type Nokia Cellular Datacard, which is manufactured by Nokia Mobile Phones Ltd., Finland, the data interface of the mobile station can be connected to any portable PC which is provided with a PCMCIA card location. The PCMCIA card thus provides the PC with an access point, which supports the protocol of the telecommunication application used in the computer 4, for instance CCITT X.25 or Internet Protocol IP. Alternatively, the mobile station 3 may directly provide an access point which supports the protocol used by the application of the PC 4. Furthermore, it is possible that the mobile station 3 and the PC are integrated into one unit within which the application program is provided with an access point supporting the protocol used by it.

It is apparent that mobile users will require access to various data networks through a packet radio network. This requires that for instance the GPRS system must be capable of operating together with external data networks PSPDN of different types, such as Internet and X.25 networks. This means that the GPRS system has to support different network addressing schemes (and network addresses) and the data packet formats of different protocols.

Figures 2, 3:
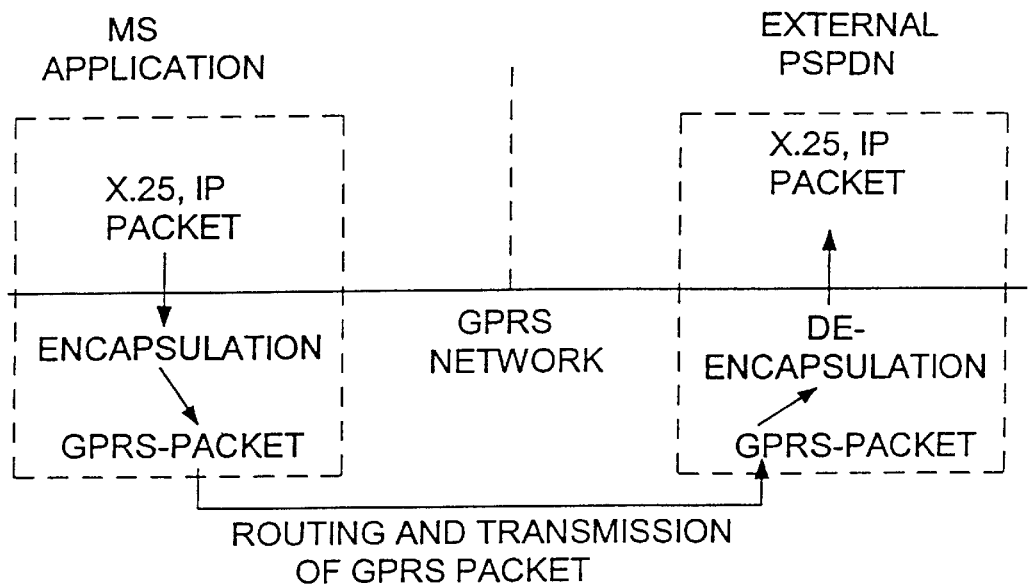
FIG. 2 is a diagram which illustrates the encapsulation of data packets.
FIG. 3 shows a PPP data frame, FIGS. 4A, B, C, D, E, F and G illustrate different protocol frames at the encapsulation, compression, transmission, decompression and de-encapsulation stage.

The general mechanism by which data transmission supporting many external PSPDN networks can be implemented in a GPRS data network is shown in FIG. 2. The idea is that for instance a data packet of the protocol used by an external PSPDN, sent by the application of a data terminal equipment MS, is encapsulated in the data terminal equipment in the frame format used by the GPRS network, said frame format being independent of the protocol of the application of the data terminal equipment or that of the external PSPDN. The GPRS packet also contains information on the protocol used by the terminal equipment or the application, and data sent by the terminal equipment. The GPRS packet is routed and transmitted from the data terminal equipment MS to the GPRS support node serving it, said GPRS support node forwarding the GPRS packet further to such a point of the GPRS network or the external PSPDN network that supports the protocol of the application. When the GPRS packet has arrived in such a point, the GPRS packet and the encapsulation are released, and the original packet is forwarded further by means of the address data provided therein. Due to the encapsulation, the GPRS network can forward packets of different protocols even if the GPRS network did not directly support said protocols itself.

To achieve the object according to the present invention, a general, standardized protocol must be provided between a data terminal equipment MS and the support node SN serving it, said protocol providing the above-described transmission protocol which is independent of PSPDN networks and the transport layer and upper layer communication protocols used by said PSPDN networks. With the implementation of such a single independent protocol, the data terminal equipment MS is capable of providing a transmission path for all the applications associated with it. According to the preferred embodiment of the invention, the internal packet format of a GPRS network is essentially in accordance with the data encapsulation format of Point-to-Point Protocol (PPP) defined in standards RFC 1661 and 1662 of Internet Architecture Board (IAB). The PPP uses the principles, terminology and frame structure of ISO-3309-1979 High-level Data Link Control (HDLC) procedures. The PPP protocol will be described briefly in the following.

The PPP is an encapsulation protocol for both bit-oriented synchronous links and asynchronous links with 8 bits of data and no parity bit. The PPP is carefully designed to maintain compatibility with the most commonly used software. In addition, it is provided with a specified escape mechanism, which enables arbitrary data to be transmitted over the link (without the characters provided in the data being interpreted as the control characters of the frame, for instance a start/stop flag). This is done in such a manner that data characters corresponding to the control characters of the frame are replaced with two-character pairs in transmission and returned as the original special characters in reception.

The PPP encapsulation also multiplexes different network layer protocols simultaneously over a single link. It is thus intended that the PPP provide a common solution for interconnecting a wide variety of different computers, bridges and routers.

Point-to-Point Protocol PPP defines more than merely an encapsulation principle. In order for it to be sufficiently versatile to be transferred to different environments, the PPP provides Link Control Protocol (LCP). The LPC is used to automatically negotiate encapsulation format options, handle varying limits on packet size, authenticate the identity of its peers on the link, determine when a link is operating properly and when it is not operating properly, detect a looped-back link and other common configuration errors, and terminate the link.

A summary of a standard PPP frame structure is shown in FIG. 3. However, FIG. 3 does not include start/stop bits (for asynchronous links), nor bits or octets inserted in the frame for transparency. The fields of the frame are transmitted in succession from left to right.

The flag sequence FLAG is a single octet, and it indicates the beginning or end of a frame. Only one flag is required between the frames. Two successive flags constitute an empty frame, which is ignored. The address field ADDRESS is a single octet, and it contains a binary sequence 11111111 (hexadecimal 0xff), which is a so-called All Stations address. In other words, the PPP provides all stations with the same address and does not provide addresses of individual stations. The control field CONTROL is a single octet, and it contains a binary sequence 00000011 (hexadecimal 0x03). The control field contains an unnumbered information (UI) command, in which the P/F bit is set to zero. The protocol field PROTOCOL contains comprises two octets, and its value identifies the protocol of that data packet which is encapsulated in the information field of the UI frame. This protocol field is defined by the PPP, and it is not defined in HDLC. However, the protocol field is consistent with the ISO 3309 extension mechanism for address fields.

Even though the PPP is selected as the data encapsulation method within the GPRS network in the preferred embodiment of the invention, the PPP does not provide, however, all those functions which are required in link layer operation over the radio interface. This means that a special GPRS-specific radio link protocol GLP, which can provide all necessary functions, is required on the radio interface between a terminal equipment MS and a support node SN. The GLP may be an HDLC based protocol, very similar to the radio link protocol RLP already used by the GSM system. The two most important aspects to be provided by the GLP are the support of point-to-multipoint addressing and control of data frame retransmission. It should be noticed that the exact implementation of the GLP protocol is not essential as regards the invention. The frame structure of the GLP (packet format) contains, however, similar fields as PPP frames do, i.e. data field, control field, address field, flag fields and check sum field. PPP frames are transferred over the radio path as encapsulated in the data field of these GLP frames between a terminal equipment MS and a support node SN. One of the disadvantages of this protocol arrangement is that both PPP and GLP data frames contain control fields, address fields, flags, check sums, etc. Normally, all this information must be transferred from end to end. This overhead data of the link layer reduces the transmission capacity of user information.

According to the invention, this problem is avoided by minimizing the amount of control data transferred over the radio interface. This is carried out by removing a part, or preferably all, of the unnecessary fields from the PPP data frame before it is encapsulated in a GLP data frame. This is possible because the values of flag, address and control fields used in PPP data frames are constant, and thus contain no real information. The check sum field FCS of the PPP data frame can also be omitted, because the GLP data frame uses its own check sum, by means of which errors occurring on the radio interface are detected and corrected. On the whole, the terminal equipment MS and the support node SN compress the PPP data frames before they are encapsulated in GLP data frames and transferred over the radio interface. Correspondingly, the terminal equipment MS and the support node SN decompress the compressed PPP data frames transferred over the radio interface by removing them from the GLP data frames, adding the removed fields thereto, the contents of these fields being constant and thus known, and by calculating a new check sum for the returned PPP data frame by a known check sum calculation algorithm.

The encapsulation, compression, decompression and de-encapsulation stages of the invention are illustrated in FIG. 4. In FIG. 4A, the terminal equipment MS receives a data frame according to the protocol used by the application associated with said terminal equipment, for instance an X.25 frame (or an IP frame or some other frame). The terminal equipment MS performs an encapsulation by inserting the X.25 data frame in the data field of a PPP data frame, as shown in FIG. 4B. At the same time, a value in the protocol field PROTOCOL of the PPP data frame is set to indicate the protocol of the encapsulated data packet, i.e. X.25. Thereafter, the terminal equipment MS compresses the PPP data frame by removing therefrom the flag, address, control and check sum fields. The resulting compressed PPP data frame, shown in FIG. 4C, is encapsulated by inserting it in the data field of a GLP data frame, as shown in FIG. 4D. The GLP data frame is transferred from the terminal equipment MS over the radio interface to a base station BTS and routed therefrom further through the mobile communication network to the support node SN which serves the current cell of the MS. In FIG. 4E, the support node SN removes the compressed PPP data frame from the GLP data frame according to FIG. 4D and performs a decompression by returning to the PPP data frame the flag, address and control fields removed therefrom, the contents of these fields being constant. In addition, the support node SN calculates a new check sum FCS for the PPP data frame formed in this manner by means of a calculation algorithm reserved for this purpose. The result is the decompressed PPP data frame according to FIG. 4F. If the serving support node SN does not support the protocol indicated in the PROTOCOl field itself, it routes the PPP data frame forward to such a point in the GPRS network or in an external data network that supports said protocol. When the PPP data frame arrives in such a point, the encapsulation is stripped away by removing the X.25 frame from the data field of the PPP data frame. Thereafter, the X.25 frame is treated according to its own address and control fields.

If the serving support node SN supports the protocol indicated by the PROTOCOL field, the serving node strips the encapsulation away itself and delivers the X.25 frame forward on the basis of the control and address information of the X.25 frame.

Figure 4A:
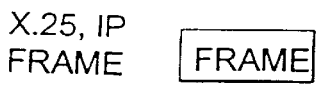
Figure 4B:
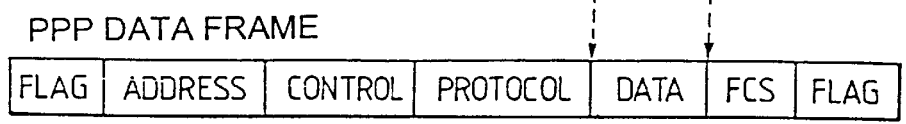
Figure 4C:
Figure 4D:
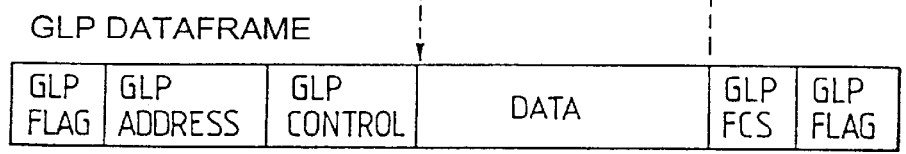
Figure 4E:
Figure 4F:
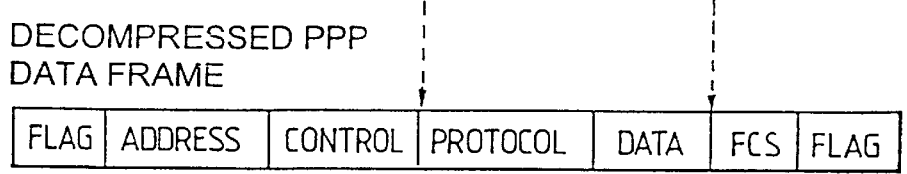
Figure 4G:
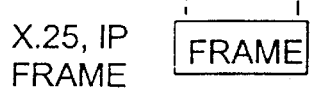

The stages according to FIGS. 4A–4G also appear in transmission taking place towards the terminal equipment MS. The encapsulation of the X.25 frame in a PPP data frame takes place either in the serving node SN or in some place on the interface of the GPRS network and the external data network. The compression of the PPP data frame according to FIG. 4C and the insertion of the compressed PPP frame in the GLP data frame according to FIG. 4D are performed in the serving support node SN. The decompression and the de-encapsulation according to FIGS. 4E, 4F and 4G are performed in the terminal equipment MS, whereafter the X.25 frame is forwarded to the application associated with the terminal equipment MS.

It should be noticed that the standard PPP protocol has its own method for compressing fields. This method is optional so that the use of the compression can be negotiated during the link configuration procedure. However, this standard PPP compression cannot be used in connection with the present invention.

The standard PPP protocol also includes a so-called byte stuffing protocol. Certain bit patterns, such as the contents reserved for the flag field, in the data field of a PPP frame are thus converted into a two-byte chain. This way of ensuring that for instance these bit patterns reserved for the flag field do not appear anywhere else in the message and lead to malfunctions. These stuffing bytes cause problems in the GPRS network, however, since the amount of data transmitted over the air interface is not independent of the data but is related to the contents of the data. In the worst case, the length of the data may be twice the length it should be due to the stuffing bytes. Since the PPP data transmitted over the radio interface is in GLP frames in a GPRS network, such "forbidden" control bit patterns in the data field do not cause malfunctions, such as an erroneous detection of the start/stop of a frame, as in a serial line. Therefore, in the preferred embodiment of the invention, all stuffing bytes are removed at the compression stage before the transmission over the radio interface, and the stuffing bytes are returned at the decompression stage on the other side of the radio interface. The data can also be compressed by other methods, for instance by using the V42.bis method used in modems.

It is also possible to combine several PPP packets in one GLP frame, which is transmitted over the radio interface, if the PPP packets are smaller than the size of the data field of the GLP packets. It is also possible to transmit one PPP packet in several GLP packets.

It is also possible that the compression and/or decompression according to the invention are only performed in the gateway node, and the compressed data packets are forwarded via the support node serving the mobile station.

The figures and the description relating thereto are merely intended to illustrate the present invention. In their details, the packet radio system and the terminal equipment of the invention may vary within the scope and spirit of the appended claims.

We claim:

1. A packet radio system comprising
   a digital mobile communication network;
   at least one packet radio support node, connected to the mobile communication network and to one or more other packet radio support nodes and/or providing an access point to an external packet data network;
   a packet data terminal equipment providing an access point for packet data transmission taking place over the radio interface, said access point supporting a universal communication protocol used by an application associated with the terminal equipment, characterized by
   using a point-to-point protocol independent of said universal communication protocol in the internal transmission of the packet radio system, a data packet according to said point-to-point protocol containing the control fields used by the protocol, an identification field identifying the protocol used by the terminal equipment, and a data field, a data packet according to the universal protocol being thus encapsulated in the data field of a data packet according to the point-to-point protocol in the internal transmission of the packet radio system,
   using a special radio link protocol between the packet data terminal equipment and said at least one packet radio support node on the radio interface, said radio link protocol supporting point-to-multipoint addressing and the control of data packet retransmission, a data packet according to said radio link protocol containing the control fields used by the protocol and a data field,
   arranging the packet data terminal equipment and said at least one support node to compress a data packet according to the point-to-point protocol, transmitted over the radio interface, by removing therefrom at least one control field and to encapsulate the remaining fields in the data field of a data packet according to the radio link protocol,
   arranging the packet data terminal equipment and said at least one support node to decompress a compressed data packet according to the point-to-point protocol, received over the radio interface, by adding thereto the fields removed in the compression before the data packet is forwarded further.

2. A packet radio system according to claim 1, characterized in that said at least one support node comprises a support node serving the mobile station and a gateway support node, which provides an access point towards an external packet data network, and that said compression and decompression are performed in the gateway support node on data packets which are forwarded via the support node serving the mobile station.

3. A packet radio system according to claim 1 or 2, characterized in that the point-to-point protocol comprises a protocol identification field, data field, check sum field, and constant address, control and flag fields.

4. A packet radio system according to claim 3, characterized in that said point-to-point protocol is essentially the point-to-point protocol PPP according to standards RFC 1661 and 1662.

5. A packet radio system according to claim 3 or 4, characterized in that
   the compression in the packet data terminal equipment or in said at least one support node comprises the removal of at least one constant field from a packet according to the point-to-point protocol,
   the decompression in the packet data terminal equipment and in said at least one node comprises the returning of the removed constant fields to the packet according to the point-to-point protocol.

6. A packet radio system according to claim 3, 4 or 5, characterized in that
   the compression in the packet data terminal equipment or in said at least one support node also comprises the removal of the check sum field from a packet according to the point-to-point protocol,
   the packet data terminal equipment and said at least one node comprise a calculation algorithm for calculating a check sum field according to the point-to-point protocol,
   the decompression in the packet data terminal equipment and in said at least one node comprises the returning of the removed constant fields to the packet according to the point-to-point protocol, and thereafter, the calculation of a check sum field by means of said calculation algorithm.

7. A packet data radio system according to any one of the preceding claims, characterized in that
   the compression in the packet data terminal equipment or in said at least one support node also comprises the removal of stuffing bytes from the data field of a packet according to the point-to-point protocol, the decompression in the packet data terminal equipment and in said at least one node comprises the adding of the removed stuffing bytes to the data field of a data packet according to the point-to-point protocol.

8. A packet data radio system according to any one of the preceding claims, characterized in that the compression in the packet data terminal equipment or in said at least one support node comprises the encapsulation of two or more data packets according to the point-to-point protocol in a compressed form in one data packet according to the radio link protocol.

9. A packet radio system according to any one of the claims 1 to 7, characterized in that the compression in the packet data terminal equipment or in said at least one support node comprises the division of a data packet according to the point-to-point protocol in a compressed form into two or more data packets according to the radio link protocol.

10. A packet radio system according to claim 1 or 2, characterized in that a data packet according to the protocol used by the application, said data packet being encapsulated in a data packet according to the point-to-point protocol in the data terminal equipment, is de-encapsulated in such a point of the packet radio system or the external data network that supports the protocol indicated by said protocol identification field.

11. A packet radio system according to claim 1, characterized in that a data packet according to the protocol used by the application is also compressed by using generally used compression methods, such as the V.21.bis algorithm.

12. A terminal equipment for a packet radio system, said terminal equipment providing an access point for packet data transmission taking place over the radio interface, said access point supporting a universal communication protocol used by the application associated with the terminal equipment, characterized in that the terminal equipment uses a point-to-point protocol independent of said universal communication protocol in the internal transmission of the packet radio system, a data packet according to said point-to-point protocol containing the control fields used by the protocol, an identification field identifying the protocol used by the terminal equipment, and a data field, the terminal equipment uses, in the transmission taking place over the radio interface, a special radio link protocol used in the inter-nodal transmission of the packet radio system, said protocol supporting point-to-multipoint addressing and the control of data packet retransmission, a data packet according to said radio link protocol containing the control fields used by the protocol and a data field, the terminal equipment is arranged to encapsulate a transmitted data packet according to the universal protocol in the data field of a data packet according to said point-to-point protocol, the terminal equipment is arranged to compress a data packet according to the point-to-point protocol, transmitted over the radio interface, by removing therefrom at least one control field and to encapsulate the remaining fields in a data packet according to the radio link protocol, the terminal equipment is arranged to decompress a compressed data packet according to the point-to-point protocol, received over the radio interface, by adding thereto the fields removed in the compression, the terminal equipment is arranged to release a data packet according to the universal protocol from a decompressed data packet according to the point-to-point protocol.

13. A terminal equipment according to claim 12, characterized in that said point-to-point protocol is essentially the point-to-point protocol PPP according to standards RFC 1661 and 1662.

14. A terminal equipment according to claim 12 or 13, characterized in that said point-to-point protocol comprises a protocol identification field, data field, check sum field, and constant address, control and flag fields.

15. A packet radio system according to claim 14, characterized in that the compression comprises the removal of at least one fixed-value field from a packet according to the point-to-point protocol, the decompression comprises the returning of the removed fixed-value fields to a packet according to the point-to-point protocol.

16. A packet radio system according to claim 14 or 15, characterized in that the compression in the packet data terminal equipment or in said at least one support node also comprises the removal of the check sum field from a packet according to the point-to-point protocol, the packet data terminal equipment and said at least one node comprise a calculation algorithm for calculating a check sum field according to the point-to-point protocol, the decompression in the packet data terminal equipment and in said at least one node comprises the returning of the removed constant fields to the packet according to the point-to-point protocol, and thereafter, the calculation of a check sum field by means of said calculation algorithm.

* * * * *